(12) United States Patent
Muffat et al.

(10) Patent No.: US 11,675,926 B2
(45) Date of Patent: Jun. 13, 2023

(54) SYSTEMS AND METHODS FOR SUBSET SELECTION AND OPTIMIZATION FOR BALANCED SAMPLED DATASET GENERATION

(71) Applicant: Dathena Science Pte Ltd, Singapore (SG)

(72) Inventors: Christopher Muffat, Singapore (SG); Tetiana Kodliuk, Singapore (SG)

(73) Assignee: DATHENA SCIENCE PTE LTD, Singapore (SG)

( * ) Notice: Subject to any disclaimer, the term of this patent is extended or adjusted under 35 U.S.C. 154(b) by 280 days.

(21) Appl. No.: 16/730,111

(22) Filed: Dec. 30, 2019

(65) Prior Publication Data
US 2020/0250241 A1 Aug. 6, 2020

(30) Foreign Application Priority Data
Dec. 31, 2018 (SG) .......................... 10201811834U

(51) Int. Cl.
*G06F 16/93* (2019.01)
*G06F 21/62* (2013.01)
(Continued)

(52) U.S. Cl.
CPC ........ *G06F 21/6245* (2013.01); *G06F 16/906* (2019.01); *G06F 16/9035* (2019.01);
(Continued)

(58) Field of Classification Search
CPC .... G06F 16/21; G06F 16/9035; G06F 16/906; G06F 16/93; G06F 16/903; G06F 18/23213; G06K 9/6223; G06K 9/6217
See application file for complete search history.

(56) References Cited

U.S. PATENT DOCUMENTS

| | | | |
|---|---|---|---|
| 6,990,238 B1 * | 1/2006 | Saffer | G06F 16/34 707/E17.093 |
| 7,945,600 B1 * | 5/2011 | Thomas | G06F 16/353 707/804 |

(Continued)

FOREIGN PATENT DOCUMENTS

| WO | 03032107 A2 | 4/2003 |
|---|---|---|
| WO | 2016166760 A1 | 10/2016 |

OTHER PUBLICATIONS

Thomas Lampert, Thi-Bich-Hanh Dao, Baptiste Lafabregue, Nicolas Serrette, . . . "Constrained distance based clustering for time-series: a comparative and experimental study", pp. 1663-1707 (Year: 2018).*

(Continued)

*Primary Examiner* — Merilyn P Nguyen
(74) *Attorney, Agent, or Firm* — FisherBroyles, LLP; Jason P. Mueller

(57) ABSTRACT

Methods and systems for data management of documents in one or more data repositories in a computer network or cloud infrastructure are provided. The method includes sampling the documents in the one or more data repositories and formulating representative subsets of the sampled documents. The method further includes generating sampled data sets of the sampled documents and balancing the sampled data sets for further processing of the sampled documents. The formulation of the representative subsets is performed for identification of some of the representative subsets for initial processing.

21 Claims, 12 Drawing Sheets

(51) Int. Cl.
  *G06F 16/9035* (2019.01)
  *G06N 20/00* (2019.01)
  *G06F 16/906* (2019.01)
  *G06F 18/23213* (2023.01)

(52) U.S. Cl.
  CPC ........ *G06F 16/93* (2019.01); *G06F 18/23213* (2023.01); *G06N 20/00* (2019.01)

(56) References Cited

U.S. PATENT DOCUMENTS

| | | | |
|---|---|---|---|
| 2006/0242180 A1* | 10/2006 | Graf | G06F 16/38 |
| 2010/0325102 A1* | 12/2010 | Maze | G06F 16/93 |
| | | | 707/738 |
| 2012/0192286 A1* | 7/2012 | Messing | G06F 16/353 |
| | | | 726/27 |
| 2012/0311426 A1* | 12/2012 | Desai | G06F 40/205 |
| | | | 715/243 |
| 2014/0081984 A1* | 3/2014 | Sitsky | G06F 9/505 |
| | | | 707/741 |
| 2014/0279716 A1 | 9/2014 | Cormack | |
| 2017/0147944 A1 | 5/2017 | Csurka | |
| 2018/0165362 A1* | 6/2018 | Engelko | G06F 16/36 |
| 2018/0300315 A1 | 10/2018 | Leal | |
| 2018/0329990 A1 | 11/2018 | Severn | |
| 2019/0197487 A1* | 6/2019 | Jersin | H04L 51/214 |
| 2019/0332486 A1* | 10/2019 | Aseev | G06F 16/907 |
| 2020/0073882 A1* | 3/2020 | Guggilla | G06N 3/044 |

OTHER PUBLICATIONS

Brownlee, J, 8 Tactics to Combat Imbalanced Classes in Your Machine Learning Dataset.

\* cited by examiner

SYSTEMS AND METHODS FOR SUBSET SELECTION AND OPTIMIZATION FOR BALANCED SAMPLED DATASET GENERATION

PRIORITY CLAIM

This application claims priority to Singapore Patent Application No. 10201811834U filed on 31 Dec. 2018, the entire contents of which is incorporated herein by reference.

TECHNICAL FIELD

The present invention relates generally to document management, and more particularly relates to unsupervised machine learning methods, statistic techniques and file management platform systems for content aware data sampling with its further classification.

BACKGROUND OF THE DISCLOSURE

Information is one of the most important assets in any industry. With more and more cyber-attacks and data breach stories appearing in the media, organizations become aware of the importance of data confidentiality management. Further, to protect sensitive data, and to meet regulatory requirements imposed by different jurisdictions, more and more organizations' electronic documents and e-mails ("unstructured data") need to be monitored, categorised, and classified internally.

The exponential growth of unstructured data within different types of industries causes scalability issues for processing of such unstructured data when the full dataset cannot be treated in one batch. And among all the unstructured data an organization possesses, only a small percentage of such data belongs to business significant data.

The amount of client data, which comes in terabytes, petabytes and exabytes does not allow processing all documents at one time. Moreover, it is highly difficult to train models on trillions of samples. At the same time, the general domain specific dataset is always imbalanced in terms of document types, topics and data sensitivity making it extremely difficult to select which part of the dataset will be balanced or will exceed size expectations for models training.

Thus, there is a need for methods and systems for documents classification, personal data extraction, purpose of the document processing prediction which can select a subset from a big data pool and can follow the same distribution as the big data pool while covering all significant specific use cases present in the full dataset. Furthermore, other desirable features and characteristics will become apparent from the subsequent detailed description and the appended claims, taken in conjunction with the accompanying drawings and this background of the disclosure.

SUMMARY

According to at least one embodiment of the present invention, a method for data management of documents in one or more data repositories in a computer network or cloud infrastructure is provided. The method includes sampling the documents in the one or more data repositories and formulating representative subsets of the sampled documents. The method further includes generating sampled data sets of the sampled documents and balancing the sampled data sets for further processing of the sampled documents. The formulation of the representative subsets is performed for identification of some of the representative subsets for initial processing.

According to another embodiment of the present invention, a system for data management of documents in one or more data repositories in a computer network or cloud infrastructure is provided. The system includes one or more filters, a clustering module, a sampling module and a classification module. The one or more filters generate a sample of the documents in the one or more data repositories and the clustering module formulates representative subsets of the sampled documents. The sampling module generates sampled datasets of the sampled documents and the classification module classifies or categorizes documents in the sampled datasets of the sampled documents.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 2, comprising FIGS. 2A and 2B, depicts block diagrams of filtering and sampling documents in accordance with the present embodiments, wherein FIG. 2A depicts a block diagram of document subset selection and FIG. 2B depicts a block diagram of smart sampling.

FIG. 3, comprising FIGS. 3A and 3B, depicts data flow for filtering, sampling and classification of documents in accordance with the present embodiments, wherein FIG. 3A depicts the pipeline for such data flow and describes automated smart sampling of the documents in accordance with the present embodiments and FIG. 3B depicts.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiments to present a method for content and context aware data classification by business category is provided. The method includes scanning one or more documents in one or more network data repositories of a computer network or repository on the cloud and extracting content features and context features of the one or more documents for further online and offline classification. The method also includes representative sampling of the subset of documents from the pool of data by using weighted clustering techniques and subclustering approaches. In accordance with present embodiments, the method and systems advantageously speed up the process of the unstructured data classification and reduce the cost of such computations. The systems and methods in accordance with the present embodiments could be used for active learning purposes by sampling the subset, which needs to be sent to oracle.

Document classification, personal data extraction, purpose of the document processing prediction and similar data management techniques require a methodology which can select a subset of documents from a big data pool, where subsequent subsets follow similar distributions as initial ones and the subset covers all the specific use cases which are present in the full dataset.

Sampling solutions in accordance with present embodiments allow the system to split the jobs into batches and process the full dataset iteratively with continuous reporting to and end user. Moreover, sampling solutions in accordance with present embodiments can focus on the most important and recent data first—this data is called "business critical data".

According to an aspect of the present embodiments, a method for the representative sampling of the subset of documents from the pool of unstructured data is provided. The method includes scanning the documents in one or more network data repositories of a computer network or repository on Cloud and extracting content features of the documents for further clustering and sampling. According to an aspect of the present embodiments, weighted clustering, deep learning clustering and subclustering techniques are developed for the documents grouping with their further subsampling.

Figure 1:
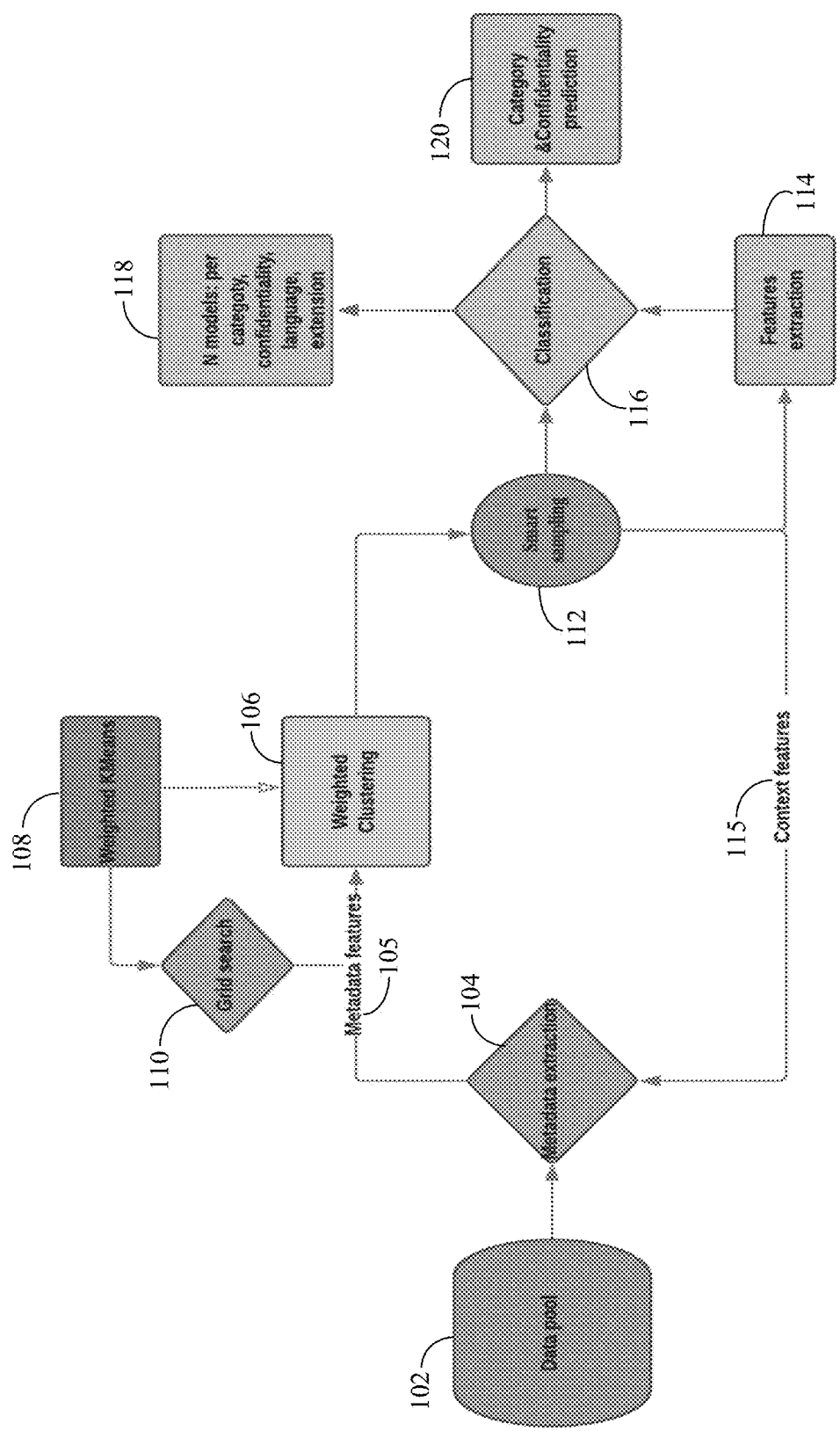
FIG. 1 depicts a flowchart for sampling and classification of a subset of documents from a data pool in accordance with present embodiments.

Referring to FIG. 1, a flowchart 100 depicts a method for representative sampling and classification of a subset of documents from a data pool 102 of unstructured data in accordance with present embodiments. The data pool 102 includes documents of unstructured data and may include one or more data repositories in a computer network or cloud infrastructure for storage of such documents. Metadata is extracted 104 from documents in a subset of the documents and metadata features 105 in the extracted metadata is utilized to cluster the documents by weighted clustering 106. The weighted clustering 106 of the documents is determined in accordance with a weighted k-means algorithm 108 which is also used to control a grid search algorithm 110 which filters the metadata features 105 for identifying the documents in the subset of documents.

The clustered documents from the weighted clustering 106 are smart sampled 112 in accordance with the present embodiments. The smart sampled documents have features extracted 114 and context features 115 identified. The context features 115 are used for the metadata extraction 104. The extracted features 114 are used to classify 116 the sampled documents. The classification 116 can create models 118 based on categories, confidentiality, language, extensions and other parameters of the sampled 112 and classified 116 documents. The classified documents 116 can also be used for category and confidentiality prediction 120. Advantageously, the method in accordance with the present embodiments as exemplified in the flowchart 100 increases speed and reduces cost for unstructured data classification 116.

Figure 2A:
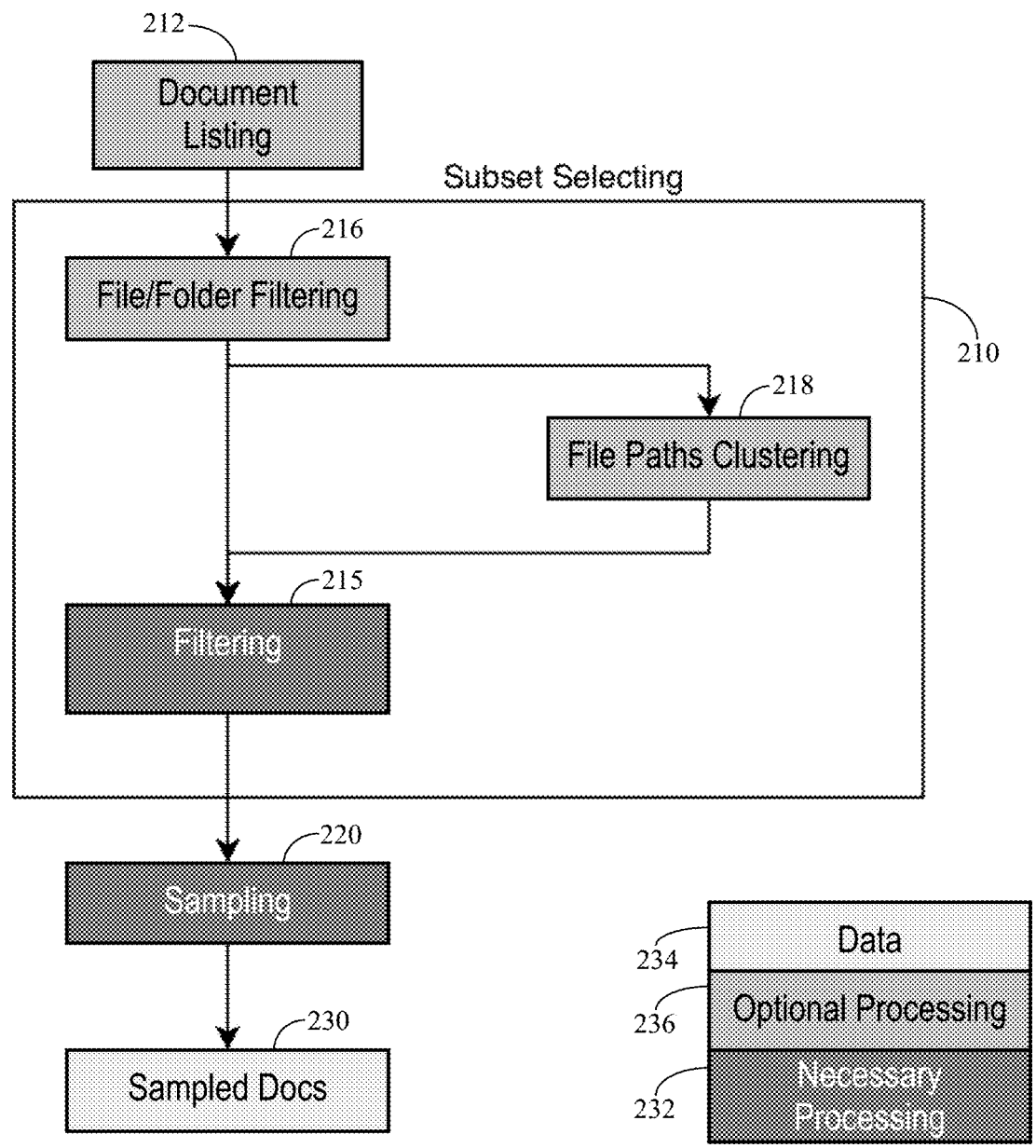

Thus, in accordance with the present embodiments, a method for data management of the documents in the data pool 102 has been provided. The method includes sampling 112 the documents, formulating representative subsets of the sampled documents, generating sampled data sets of the sampled documents, and balancing the sampled data sets for further processing of the sampled documents. The formulation of the representative subsets is performed for identification of some of the representative subsets for initial processing. Referring to FIG. 2A, a block diagram 200 depicts document subset selection 210 in accordance with an aspect of the present embodiments. The document subset selection 210 accesses documents in a document listing 212 and filters 215 the documents for the document subset selection 210. In order to optimize the filtering 215, the files and folders may be filtered 216 and/or the file paths may be clustered 218 prior to the filtering 215.

After the subset selection 210, the filtered documents are sampled 220 resulting in sampled documents 230 for further processing as seen in the flowchart 100 (FIG. 1). Note that while the filtering 215 and the sampling 220 are necessary processes 232 for methods in accordance with the present embodiments to derive the data 234 in the form of the sampled documents 230, the document listing 212, the file/folder filtering 216 and the file paths clustering 213 are optional processes 236.

According to another aspect of the present embodiments, a deep learning engine for content and context aware data classification 116 (FIG. 1) is provided. The deep learning engine includes a model training module, a model validation/evaluation module and a data classification engine. The model training module is configured to predict one or more business categories based on word embeddings vectors (e.g., FastText) of the context of the documents and content included numerical vectors in the raw training set.

Figure 2B:
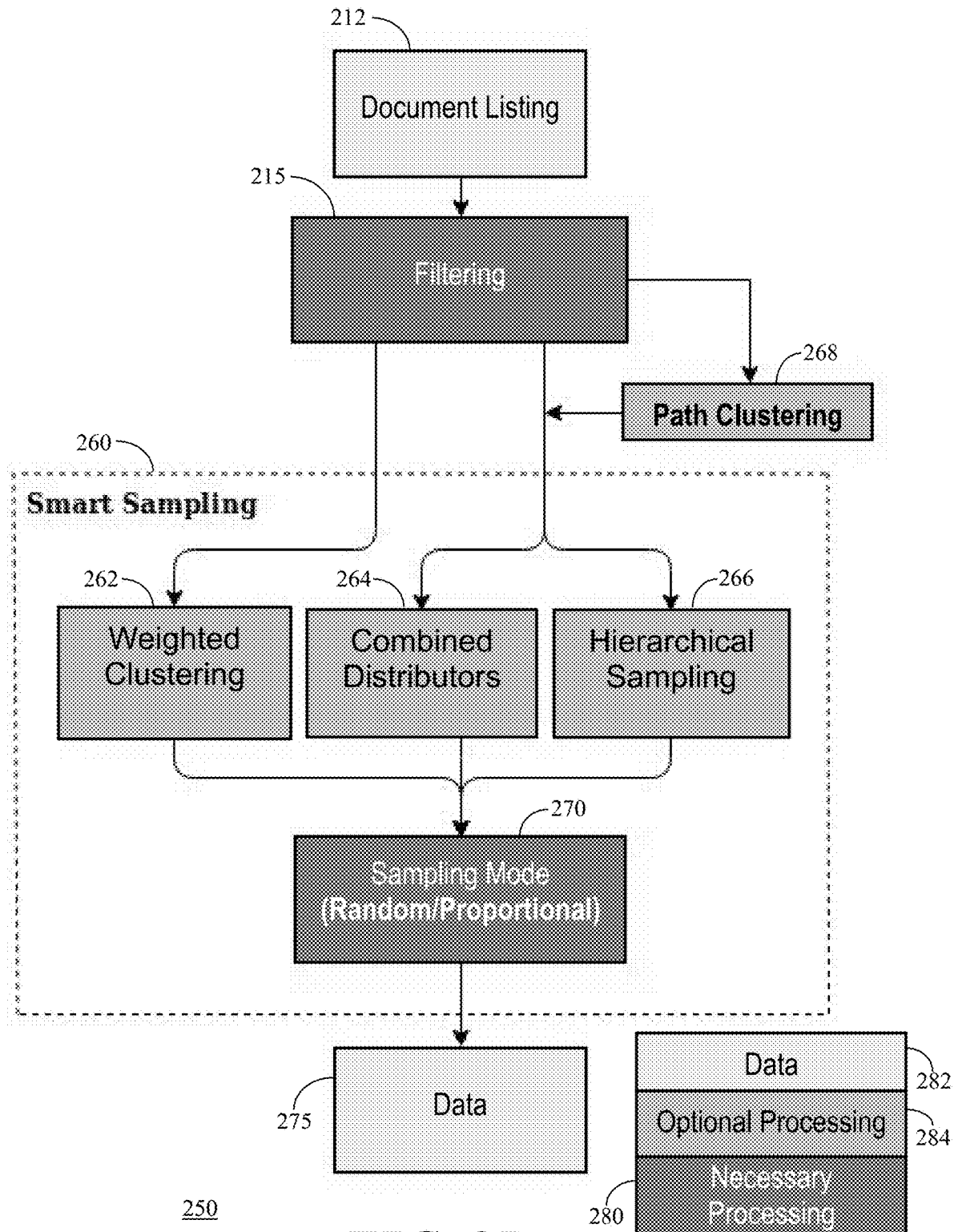

Referring to FIG. 2B, a block diagram 250 depicts smart sampling 260 in accordance with an aspect of the present embodiments. The smart sampling 260 of the documents occurs after filtering 215 the document listing 212. The smart sampling 260 includes weighted clustering 262 of the filtered documents and processing by combined distributors 264 and hierarchical sampling 266 of the filtered documents possibly after path clustering 268 of the file paths. After the weighted clustering 262, the combined distributors 264, and/or the hierarchical sampling 266, the documents are sampled in a sampling mode 270, which could either be random or proportional, to arrive at the sampled documents 275. While the filtering 215 and the sampling 270 are necessary processes 280 for methods in accordance with the present embodiments to derive the data 282 in the form of the sampled documents 275, the path clustering 268, the weighted clustering 262, the combined distributors 264, and the hierarchical sampling 266 are optional processes 284.

The smart sampling 260 is the strategy of the sampling N documents from a subset or from the entire dataset in such a way that a balanced set of documents with particular criteria will be created. The input data to smart sampling is the entire dataset or a subset or a sample form the filtering 215. As output, a sample of documents 275 is obtained. Smart sampling 260 includes some preparation steps such as clustering, for example.

The combined distributors 264 implement the strategy of sampling N documents in a balanced way with different conditions and criteria. For example, take N documents balanced by a document extension, take N documents balanced by a document date, take N documents balanced by a document owner, or take N documents balanced by a file depth.

The weighted clustering 262 implements a strategy of sampling N documents from created clusters. The clustering model is trained on the list of features and the list could be changed with different combinations. The list of features may contain remote path, extension, date, owner, depth of file, folder or other features.

The hierarchical sampling 266 implements a strategy of sampling N documents in a balanced way with different conditions and criteria in a hierarchical order. For example, the documents are clustered by one or more features and then sampled in a proportional mode (with remote path features). Then, from each sub-cluster, the documents are sampled in a random mode with a second batch of features (e.g., extension, or date). The simplest use case of the hierarchical sampling 266 is one-step hierarchical sampling when the sampling is done only via one step after clustering.

The weighted k-means model 108 (FIG. 1) is used for training and produces the cluster IDs for each documents. Then, documents are sampled 270 either in a random mode or in a proportional mode from each cluster. The random mode means that the documents are sampled randomly from each cluster. The proportional mode expects sampling of the document by taking into account distribution of documents in each cluster. For example, if a cluster contains 70% of the whole dataset, more documents will be sampled from this cluster.

For evaluating the result of the sampling 270, a report is provided that aggregates statistics so that quality can be checked. This report is generated after sampling 270 and outputs how many files have been sampled by each group of documents as defined by the distributors. Every sampleable file from this group is provided for comparison. Finally, if the distributors used involve the clustering distributor, a count of the documents in each group is provided around the centroid of the cluster. Three radiuses are defined around the centroid to group the documents and provide the counts.

Figure 3A:
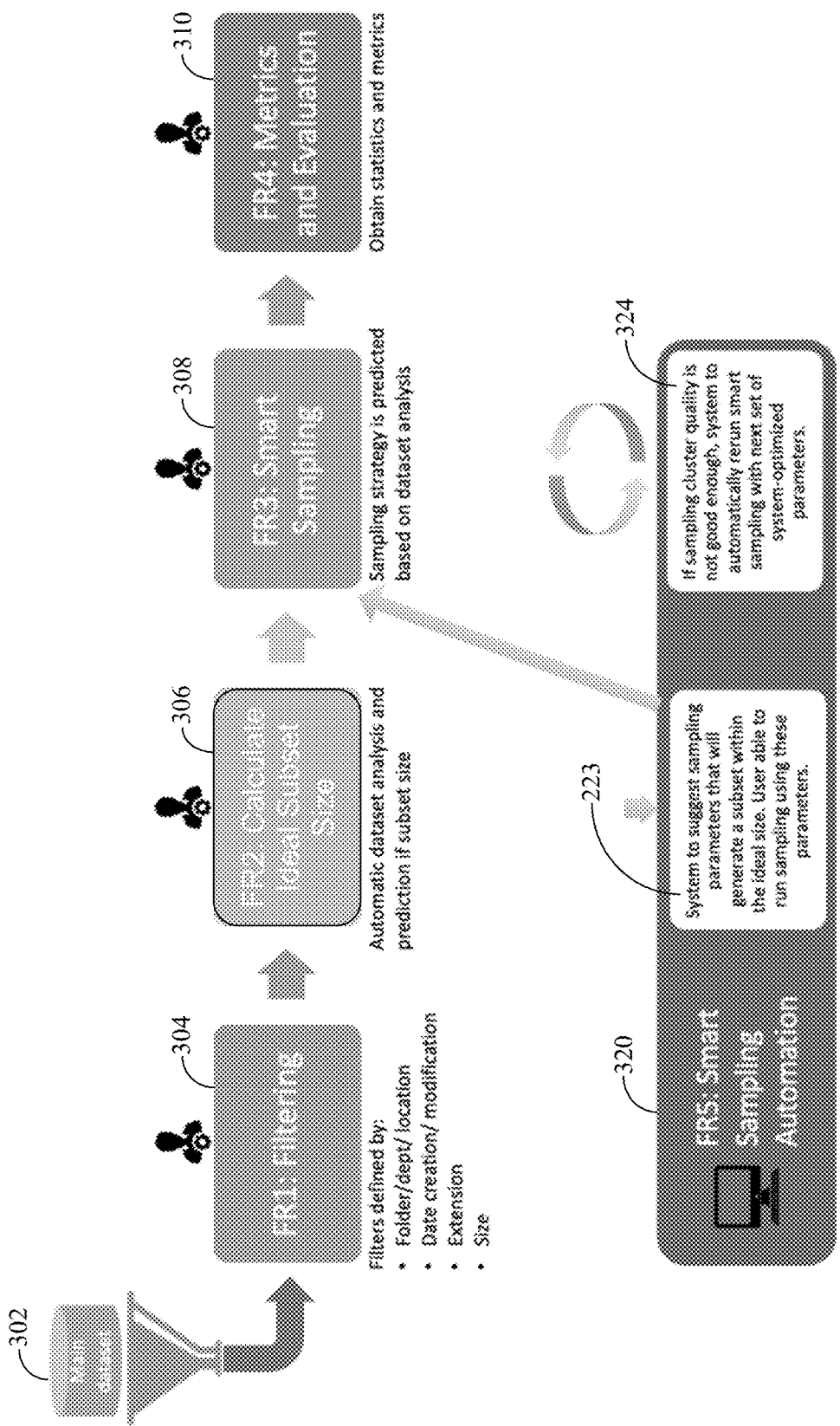

According to another aspect of the present embodiments, a subset selection method is developed to create the representative documents sampling in the pool of the documents. Among all the unstructured data an organization possesses, only a small percentage of the unstructured data is business significant data. Thus, the classification process can be accelerated and optimized by sampling unique and significant data from the pool of unstructured data by automatically selected criteria as shown in a flow diagram 300 of FIG. 3A. The main dataset 302 includes documents of unstructured data and may include one or more data repositories in a computer network or cloud infrastructure for storage of such documents (i.e., the data pool 102 (FIG. 1)). The documents of the main data set 302 are filtered 304 and an ideal subset size is calculated 306. The filtering 304 may include filters defined by, for example, folders, departments or location, or defined by date of creation or date of modification, or defined by the document extension or the documents size. The calculation 306 performs an automatic dataset analysis and subset size prediction to calculate the ideal subset size.

The subsets of the documents of unstructured data are then smart sampled 308 in accordance with the present embodiments and the sampled documents can be analyzed by metrics and evaluations 310 to obtain statistics and metrics of the sampled documents. The smart sampling 308 utilizes appropriate sampling strategies predicted by dataset analysis of the document subsets. In accordance with the present embodiments, the smart sampling 308 may be automated 320. In accordance with the smart sampling automation 320, the smart sampling 308 suggests 322 sampling parameters optimized for smart sampling 308 in accordance with the present embodiments to generate a subset within the ideal subset size calculated 306. The documents are then sampled using the suggested parameters. If the sampling cluster quality derived from the suggested parameters is not good enough, the smart sampling 308 is automatically rerun 324 with a next set of system-optimized parameters. In this manner, the classification process is accelerated and optimized by sampling unique and significant data from the pool of unstructured data by automatically selected criteria/parameters 320.

According to another aspect of the present embodiments, a text summarization engine for keyword and/or keyphrase extraction has been developed. The text summarization engine allows creation of representative combinations of positive and negative keywords/keyphrases for automated smart sampling 320.

In accordance with another aspect of the present embodiments, a model training module is configured to select a clustering model from one or more clustering models based on a confirmation of category classifications corresponding to the clustering model by an administrator of a computer network. A model evaluation module is configured to evaluate the selected clustering model by applying the selected clustering model to cluster documents in a raw test set. And the data classification engine 116 (FIG. 1) is configured to classify all of the one or more documents into the number of category classifications using the selected clustering.

Weighted clustering techniques as well as deep learning clustering are utilized to obtain balanced subsets for their further classification by business categories and confidentiality 120 (FIG. 1). Personal data and time features may also be used for business-critical data recognition and sampling. Further, document similarity measurements may be defined to match similar documents by context and content of the documents for further unique sample processing.

An attribute weighting clustering algorithm may be used to address problems of feature importance by, for every element, an associated real-valued weight is assigned representing the element's "mass" or "importance". Based on these properties, clustering algorithms can be classified into three modes based on their usage: those clustering algorithms that are affected by weights on all data sets, those that ignore weights, and those clustering algorithms that respond to weights on some configurations of the data but not on others.

In case of feature weighted k-means 108 (FIG. 1), two levels of feature weights are introduced: a feature weight for all clusters and a cluster dependent weight. In this manner, the best weights for the distributors 264 (FIG. 2) can be approximated by using the grid search 110 (FIG. 1) and a silhouette score of the clusters as a performance metric. Before the grid search 110, the documents are separated into groups or clusters whose elements should be treated with the same weighting. The grouping process is left to the user and consists in finding predicates that characterize the groups to be created using the documents' features (e.g., metadata features 105). If such groups cannot be defined, all of the documents are grouped together.

For each filtered 215 set of documents (FIG. 2B), the sampling weights are used to sample in a grid search space and cluster the sampled documents using the clustering weights. Once the clustering is computed, the silhouette score is tracked and the clustering and sampling are stored.

A dataset balancing system for further document classification includes a smart sampling engine 320 (FIG. 3A) in accordance with the present embodiments. Instead of random subset selection, an unsupervised machine learning approach is used, which is a data drive approach which helps achieve the goals formulating clusters of good quality by reducing category imbalance and ensuring representation of most documents types in the clusters, reduce occurrences of Out of Memory errors or other errors due to a lack of resources that might occur during execution of artificial intelligence models, and ease the process of category definition.

The logic of smart sampling 320 in accordance with the present embodiments is to group the documents by their contextual topic, location, date and access rules into groups of similar items by leveraging the unsupervised machine learning techniques. After the grouping, samples of the documents are extracted from each group by keeping proportional distribution and completeness of choice. The smart sampling solution 320 solves the problem of subset selection for document classification, personal data extraction, and data loss prevention and provides a methodology that is able to select a dataset from a big data pool, follows a similar distribution for all selected datasets, cover specific use cases, and is scalable to the whole data pool 102 (FIG. 1).

In accordance with the present embodiments, smart sampling is aimed to achieve the following key objectives: (i) improve the quality of document classification, (ii) create balanced datasets which are subsets of a general dataset while following the distribution of the general dataset, (iii) ease the process of category definition, (iv) allow a user to create subsets that reflect specific business use cases (e.g., prioritize "business critical data" through selection of the most important data or through selection of the most recent data); (v) provide a data driven approach; (vi) provide supervised classification algorithms from the list of processes thus identified; and (vii) reduce the cost of computation resources for model training and retraining.

The general dataset or data pool 102 can be split into smaller parts in accordance with the present embodiments like a dataset, an activity, a subset, a filter or filtering action, or a sample or sampling action. A dataset is a collection of documents which could be equal to the amount of documents in a data source or data pool or to its subset which satisfies next characteristics: (i) the dataset is created from another dataset; (ii) the dataset comes with a set of statistics and metrics (e.g., number of files, total size, distribution, strategy used, and/or related models); (iii) the selection is made by using filtering or sampling strategies; and (iv) the dataset could be created, deleted, or visualized.

An activity represents a batch job and is a useful concept for progress monitoring and tracking of operations that have been applied to a dataset. A subset or subset dataset is a smaller dataset obtained from a parent dataset using the filtering or sampling actions. A filter or filtering action is defined as a set of filters based on file metadata and file path which allows reduction in the scope of documents to be processed. And a sample or sampling action is a set of algorithms that outputs a dataset that is a subset of the parent dataset inputted.

Figure 3B:
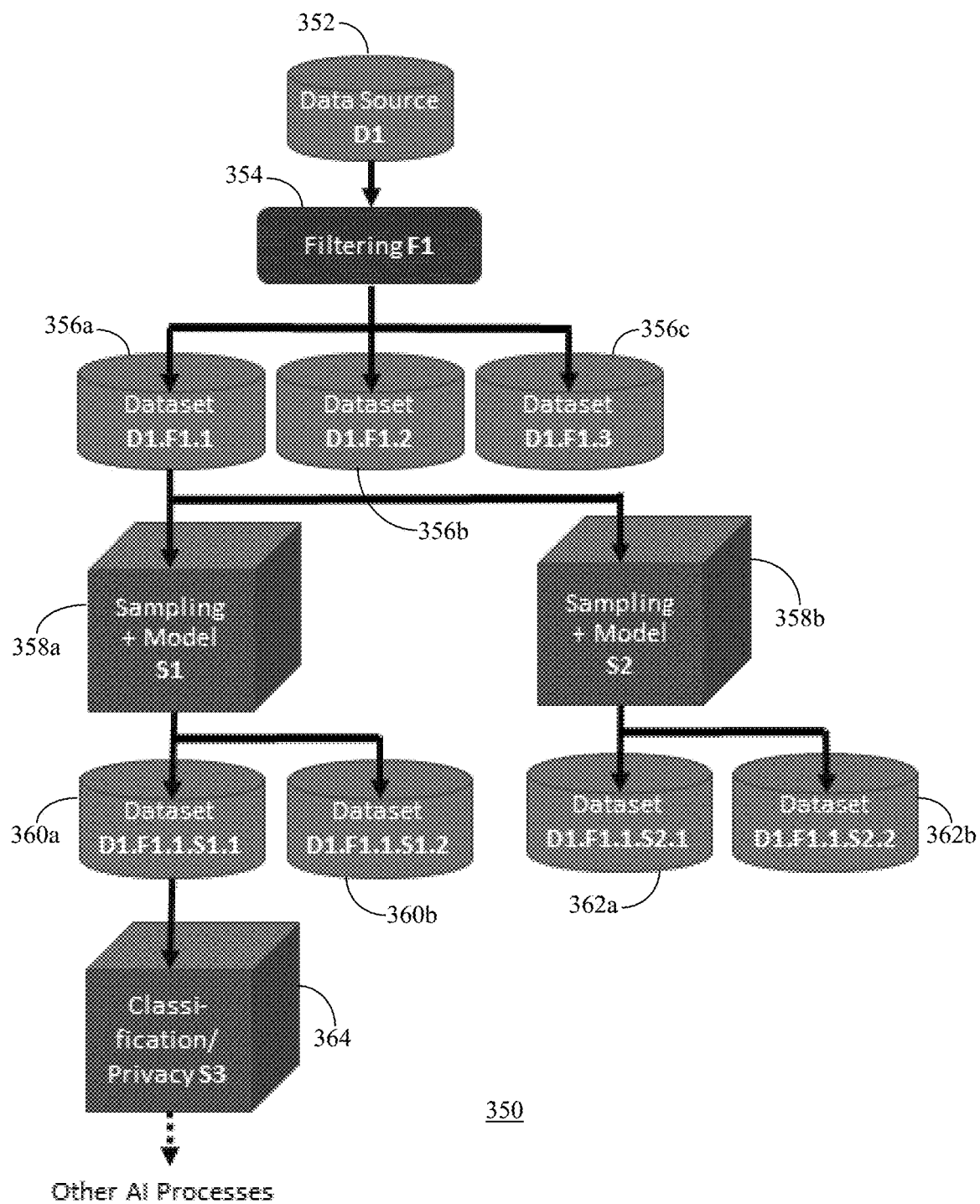

The proposed user workflow is captured in the flow diagram 300 (FIG. 3). The subset resulting from the smart sampling 320 may be used to train a classification model (supervised or unsupervised), as shown in a data flow diagram 350 in FIG. 3B. The data flow diagram 350 depicts how data flows through methods and systems in accordance with the present embodiments. A data source D1 352 of documents are filtered by filtering F1 354 resulting in various filtered data sets 356a, 356b. 356c. The filtered datasets are identified as dataset D1.F1.1 356a, D1.F1.2 356b, and D1.F1.3 356c.

Various sampling and models 358a, 358b can be applied to each dataset resulting in various sample datasets 360a, 360b, 362a, 362b. The dataset samples resulting from the sampling and modeling module S1 358a are identified as dataset D1.F1.1.S1.1 360a and D1.F1.1.S1.2 360b. The dataset samples resulting from the sampling and modeling module S2 358b are identified as dataset D1.F1.1.S2.1 362a and D1.F1.1.S2.2 362b. For each dataset 360a, 360b, 362a, 362b, classification and privacy settings S3 364 and other AI processes can be performed. By tagging the datasets in this manner, it can easily be determined for each data set what filtering 354, what sampling 356a, 356b including what models are used for sampling 356a, 356b, and what classification/privacy processes 364 have been performed on the dataset.

The sampling process performed by the sampling and modelling modules 358a, 358b may be defined with a few different strategies, each of which will produce different data types. Filtering 354 is the procedure of selecting a set of documents by applying one or more conditions, such as those documents located in specific folders, those documents having dates of creation or modification is later/earlier/between a configurable date or configurable date range, and documents having specific extensions (e.g., extensions in a particular list). The input data (i.e., the data source 352) to the filtering 354 is the entire dataset and the output are datasets 356a, 356b, 356c. Filtering 354 does not balance the datasets 356a, 356b, 356c, but just selects the datasets 356a, 356b, 356c of documents.

A sampling mode 270 (FIG. 2B) can be random or proportional. Random sampling is a procedure of random sampling N documents from the dataset or general dataset or the sample of the documents. The input data to random sampling is the entire dataset or the dataset. As output we get a sample of documents. Random sampling does not balance the dataset. Proportional sampling keeps proportional distribution and completeness of choice when sampling the documents.

Smart sampling is the strategy of sampling N documents, either from the dataset or the entire dataset, such that a balanced set of documents fulfilling the criterion will be created. The input data to smart sampling could be the entire dataset, a dataset or the sample. A sample of documents is produced as an output. Smart sampling includes some preparatory steps such as clustering.

Figure 4A:
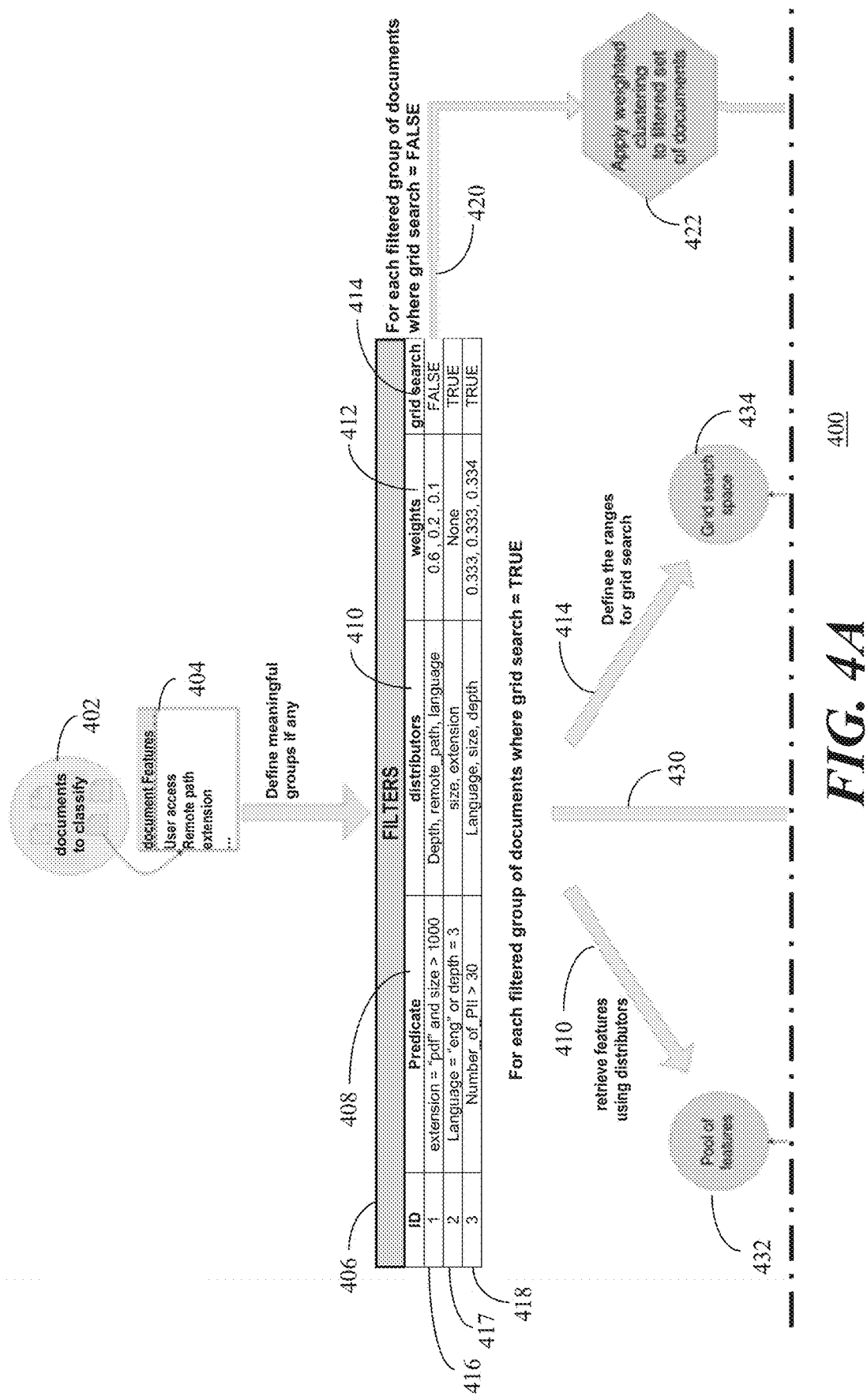
FIG. 4 depicts a system for subset selection and optimization for balanced sampled dataset generation in accordance with the present embodiments.
Figure 4B:
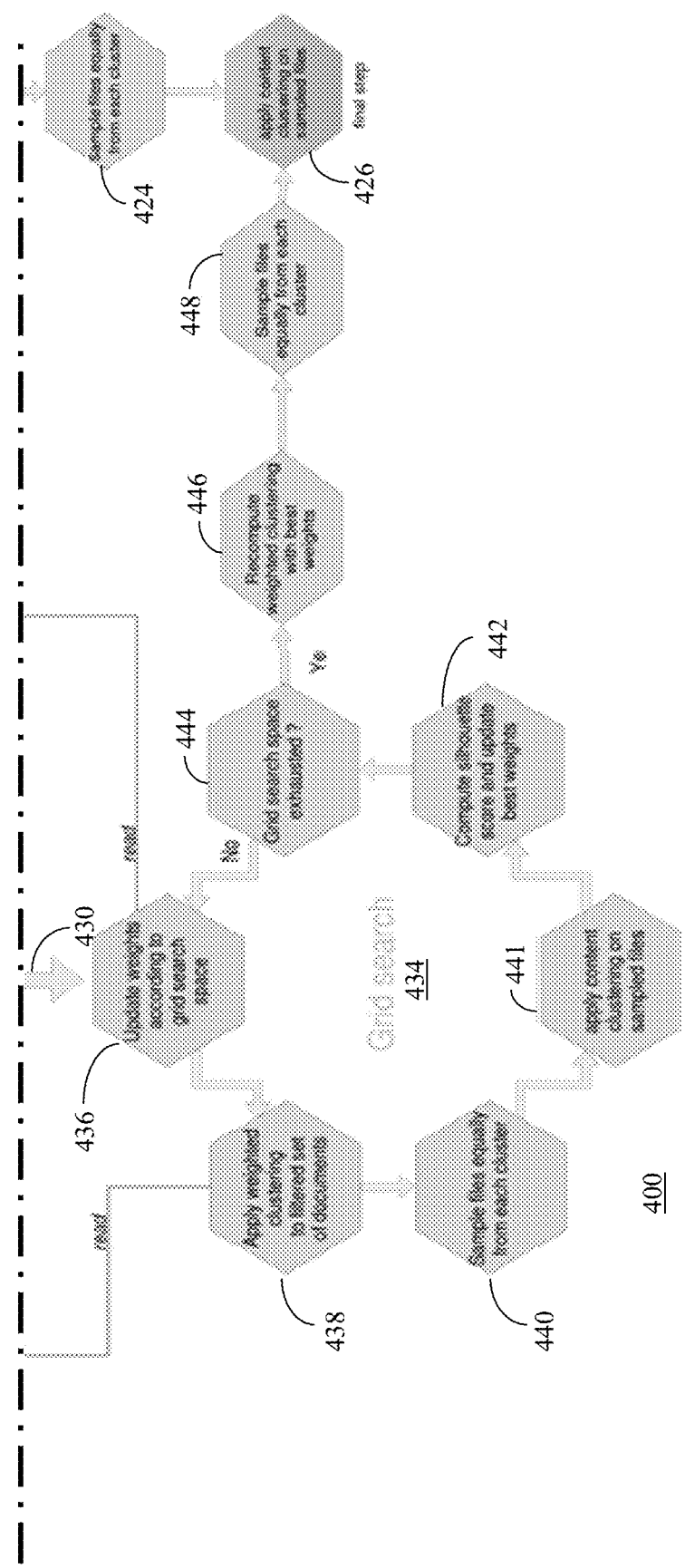

Referring to FIG. 4 a diagram 400 depicts a system for subset selection and optimization for balanced sampled dataset generation in accordance with the present embodiments. Within the documents to be classified 402, document features 404 such as user access, remote path or extension are identified to determine if any meaningful groups can be defined. Filters 406 use filtering predicates 408, distributors 410, weights 412 and grid search selection 414 as criteria for filtering the documents to be classified 402.

For example, a first filtering scheme 416 uses a filtering predicate 408 "extension='pdf' and size>1000", a distributor 410 "depth, remote_path, language", weights 412 of 0.6, 0.2 and 0.1 and a grid search selection 414 of "FALSE". A second filtering scheme 417 uses a filtering predicate 408 "language='eng' or depth=3", a distributor 410 "size, extension", no weights 412 and a grid search selection 414 of "TRUE". And a third filtering scheme 418 uses a filtering predicate 408 "number_of_PII>30", a distributor 410 "language, size, depth", weights 412 of 0.333, 0.333 and 0.334 and a grid search selection 414 of "TRUE".

For each filtering scheme where the grid search selection is "FALSE", processing proceeds along a path 420 to apply 422 weighted clustering to the filtered set of documents. Files from each cluster are sampled equally 424 and content clustering is applied 426 on the sampled files.

For each filtering scheme where the grid search selection is "TRUE", processing proceeds along a path 430 for a grid search of the filtered set of documents. A pool of features 432 includes features retrieved using the distributors 410, and the grid search space 434 has ranges defined by the grid search selection 414.

Upon entering the grid search space 430, weights are updated 436 according to the grid search space 434 ranges and weight clustering is applied 438 to the filtered set of documents, the weight clustering determined from the pool of features 432. Files are then sampled equally 440 from each cluster and content clustering is applied 441 to the sampled files. A silhouette score is computed and best weights are updated 442. If the grid search space is not exhausted 444, processing repeats the grid search 434. When the grid search space is exhausted 444, the weighted clustering is recomputed 446 with the best weights, files from each cluster are sampled equally 448 and content clustering is applied 426 on the sampled files.

In accordance with the present embodiments, the quality of the clustering can be evaluated in two different ways: a supervised evaluation and an unsupervised evaluation. The supervised evaluation relies on the existence of business category labels for the files. There are three separate metrics and one aggregate metric to gauge the quality of the clustering based on ground truth labels. These metrics are a Fowlkes-Mallows score, a homogeneity metric, a completeness metric and a V-measure aggregate metric.

The Fowlkes-Mallows score is calculated by looking at three components: a true positive component which is the number of pairs of documents that belong to the same business categories and to the same clusters, a false positive component which is the number of pairs of documents that belong to the same business categories but not the same clusters, and a false negative component which is the number of documents that belong to the same clusters but not to the same business categories. The homogeneity metric measures whether each cluster contains only members of a single business category. The completeness metric measures whether all members of a business category are assigned to the same cluster. And the V-measure aggregate metric is a harmonic mean of the homogeneity metric and the completeness metric.

Each of these metrics is computed for a result of clustering in total. However, since labels are not always available, a way is also provided to measure the quality of the clustering based on several different metrics.

The following metrics are computed for each cluster and are within 0 and 1, with values closer to 1 meaning that the cluster is good for the each metric: A score that measures if the documents in a cluster all have a similar fraction of their symbols being number symbols; A score that measures if the documents in a cluster all have a similar fraction of their symbols being text symbols; A score that measures if the documents in the cluster all have a similar file size; A metric that measures the distribution of extensions of the files inside the cluster. Clusters having few extensions inside will have a better score; A score that measures if the cluster has a similar number of documents than the other clusters or if it's an outlier, and A score that measures if the cluster has an adequate number of folders inside it: Clusters with less folders inside will have a better score.

Moreover, we group these metrics into three aggregate metrics that we provide for each cluster: (i) a score for the quality of the cluster based on the above metrics relating to the metadata and general information about the files: file sizes, extension distribution, number of files and number of documents. (ii) a score for the quality of the cluster based on the above metrics relating to the content of the documents: the number and text symbols fractions. And (iii) a final complete score incorporating all of the above metrics. These aggregate metrics are weighted sums of the metrics and the user can choose which ones to include in the final metric and with which weights.

For evaluating the result of the sampling itself, a report may be provided that aggregates statistics so that quality can be checked. This report is generated after sampling and outputs how many files have been sampled by each group of documents as defined by the distributors. Every sampleable file from this group may also be provided to compare. Finally, if the distributors used involved a clustering distributor, the count of documents in each group around the centroid of the cluster may be provided. Three radii around the centroid are defined to group the documents and provide the counts.

Figure 5:
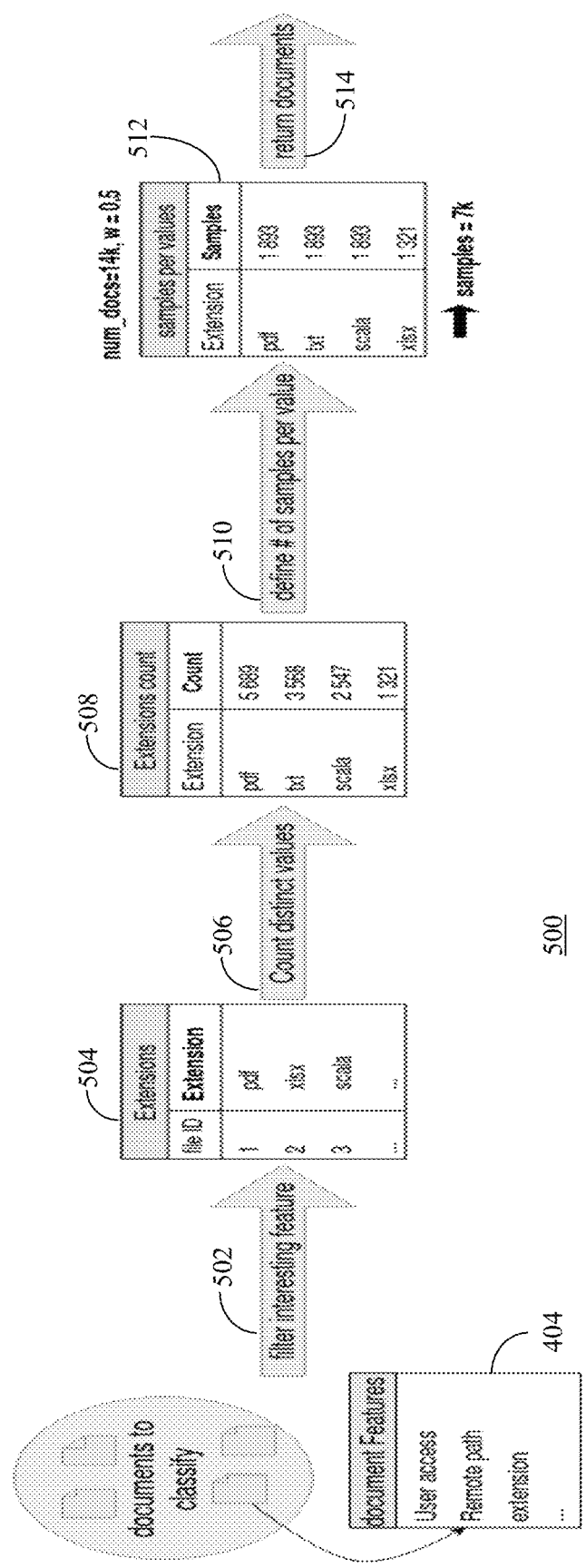
FIG. 5 depicts a flow diagram for weighted sampling in accordance with the present embodiments.

Weighted sampling is a strategy of sampling N documents from created clusters. The clustering model is trained on a list of features. The list of features could be changed with different combinations and may include: remote path, extension, date, owner, depth of file, or folder. Referring to FIG. 5, a flow diagram 500 depicts weighted sampling of documents 402 having document features 404. Interesting features are utilized for filtering 502 the documents such as extensions 504. The documents are sampled by counting 506 distinct values to obtain an extensions count 508 then defining 510 a number of samples per value to obtain the number of samples 512 per value before returning 514 the documents.

Smart sampling 270 (FIG. 2B) in accordance with the present embodiments may include a random mode or a proportional mode. Weighted k-means 108 (FIG. 1) is used for training and producing cluster IDs for each document. The documents are then sampled in either the random or the proportional mode from each cluster. For weighted clustering, documents are first clustered according to their different features. By using weighted k-means and defining the weights of the features, well-defined clusters of documents may be obtained from which the documents may be sampled either according to the random strategy where an equal number of documents are taken from each cluster or according to the proportional strategy where the proportions of the documents in each cluster are maintained in the final sample as they are in the original subset after clustering.

Hierarchical sampling 266 (FIG. 2B) is another sampling option which samples N documents in a balanced way with different conditions and criteria in a hierarchical order. For example, documents are clustered by one or more features and sampled in accordance with the proportional mode (e.g., remote path features). Then, from each sub-cluster, the documents are sampled in accordance with the random mode with a second batch of features (e.g., extension and/or date). The simplest use case of hierarchical sampling is one-step hierarchical sampling where the sampling is done only via one step after clustering.

A combined distributor is a strategy of sampling N documents in a balanced manner with different conditions and criteria (e.g., sample N documents balanced by document extensions, sample N documents balanced by document date, sample N documents balanced by document owner, or sample N documents balanced by document file depth).

Figure 6:
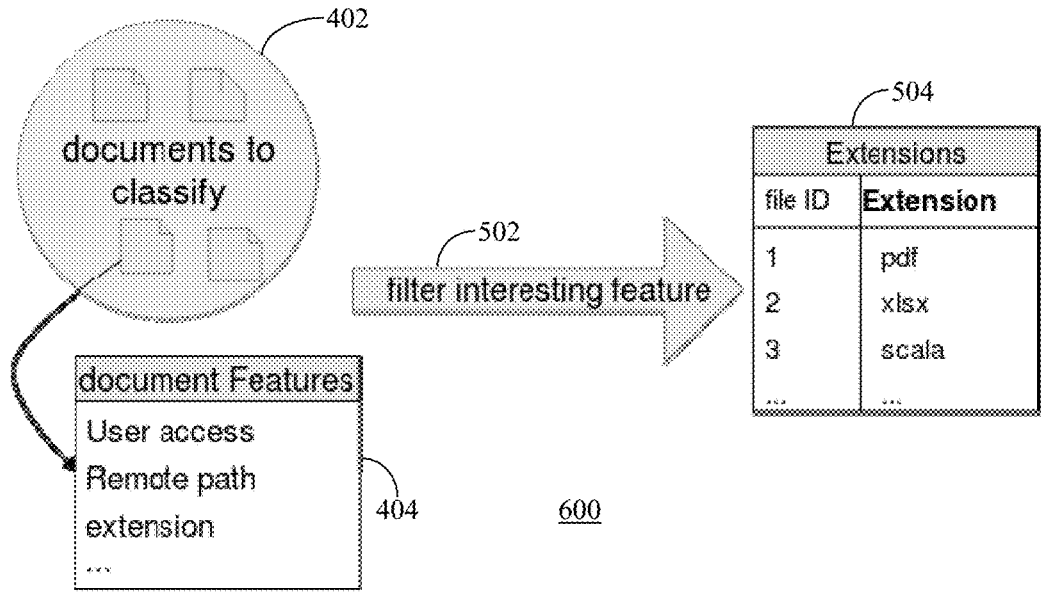
FIG. 6 depicts a flow diagram of operation of a distributor in the weighted sampling of FIG. 5 in accordance with the present embodiments.

Distributors themselves define a feature or set of features that are used to distribute documents in a sample. Referring to FIG. 6, a partial flow diagram 600 depicts operation of a distributor where interesting features are filtered 502 based on document features 404 to filter the documents 402. The features may be extensions 504. Each distributor will consider the document feature 404 that it looks at as a class of documents that can be used to distinguish the documents. In this way, in a random mode of distribution, the distributor will sample an equal amount of documents from each class while in a proportional mode the distributor will sample an amount of documents that is proportional to a fraction of documents in that class.

In accordance with the present embodiments, distributors may be stacked. This way, distributors lower in a hierarchy of stacking will regard a sample from each class of a higher distributor as a subset of documents from which to sample according to its strategy.

Some files may be included in a special group which can be treated differently by using specific distributors and weights. A filter, such as the filter 406 (FIG. 4) is used to identify such cases. The filter 406 includes an ID (e.g., the IDs 416, 417, 418), a predicate 408 such that a file is in a group if and only if the predicate is true, an indication 414 whether a grid search on weights should be done (boolean), and a list of distributors 410 and their weights 412.

Note that the weights specified by the user can be modified by the program 436 in case the grid search boolean 414 is set to TRUE. Indeed, those weights would be used as a seed for grid search to orient the search around the entered values. If a user has no idea of what a likely value for weights should be, the user can enter NONE (see weights 412 of ID 417) and the grid search 430 would explore a broader interval. Of course, one cannot enter NONE and skip the grid search phase. The filter 406 is a tool to exploit prior knowledge, its construction is consequently left to the user as seen in the IDs 416, 417, 418 of the filter 406. several examples of filters are given below. For a more accurate description, see the implementation section. Note that the features expressed in the predicates 408 are usually not the same as the ones extracted by the distributors 410.

Figure 7:
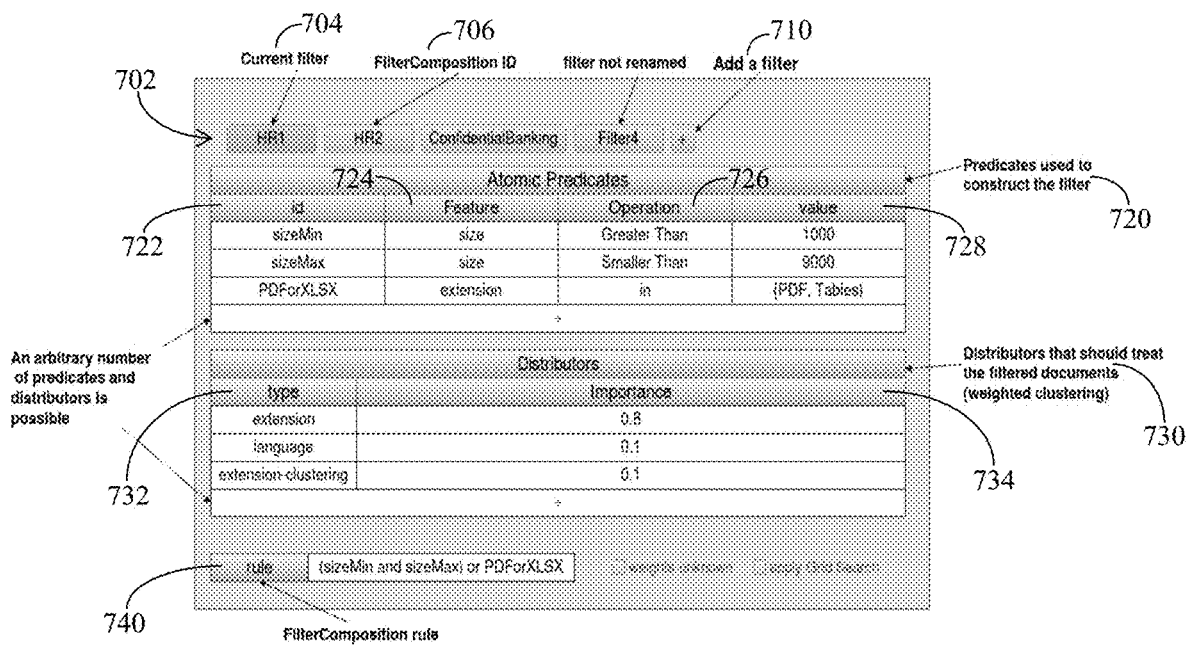
FIG. 7 depicts an illustration of an exemplary filter user interface in accordance with the present embodiments.

The filter architecture in accordance with the present embodiments is meant to facilitate the creation of a user interface. Referring to FIG. 7, an illustration 700 depicts an exemplary user interface in accordance with the present embodiments. Along an upper portion of the user interface, filter information 702 includes a current filter identification 704, filter composition information 706 and a user control 710 for adding more filters. A predicates table 720 identifies the predicates used to create the filter including predicate identification 722, feature identification 724, an operator 726 (e.g., greater than, less than, within), and values 728. A distributor table 730 describes how the distributors should treat the filter documents (e.g., weighted clustering) with identification of a type 732 of the distributor and its importance 734. Finally, at a lower portion of the user interface, a filter composition rule 740 is identified.

Referring to distributors 730, there are different types of distributors. In accordance with the present embodiments, a sampling method combines different distributors in order to get a randomised training set with limited predominant classes. Each distributor can have a different weight or importance 734 which gives more importance to relevant distributors but still adds additional randomisation with simple ones. There are different types 732 of distributors. The types of distributors include a random distributor, a file depth distributor, a file pattern distributor (since sometimes integration of all files with a specific pattern is desired, a clustering distributor (some clusters might be small and using features specific to the cluster, the size of the cluster can be increased), a simple metadata distributor using size, language, extension, or other metadata, a path clustering distributor which clusters similar folder paths together and only a maximum number of files can be sampled from those folders, a personal identifying information (PII)-based distributor which detects PIIs or random files with each type of PII and a user-access distributor. In addition, any other relevant smart sampling distributor can be included.

Figure 8:
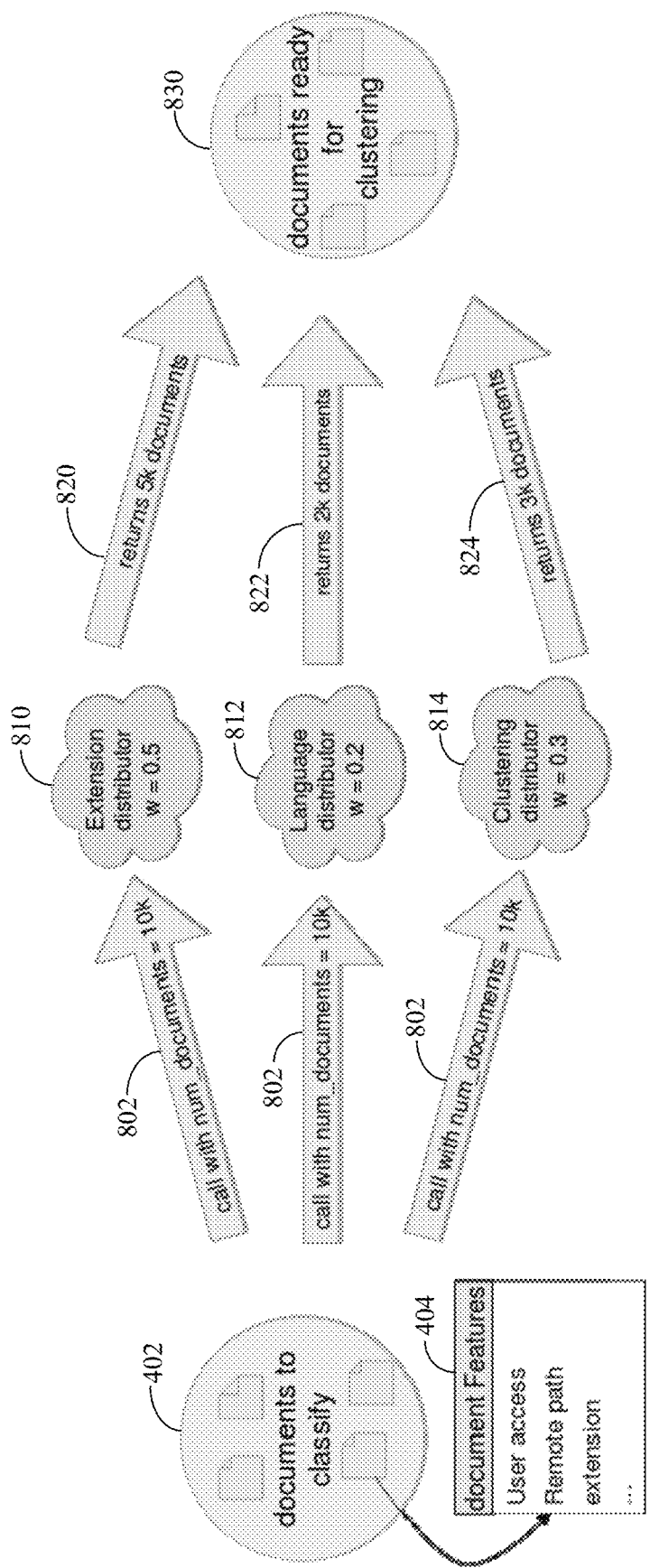
FIG. 8 depicts an illustration of operation of associated distributors in accordance with the present embodiments.

Each distributor is specialized for a different document feature. When asked to retrieve n documents, a distributor with weight w first computes the distinct values of this feature amongst the documents. Then, the distributor returns a sample of w*n documents, trying to have the same number for all distinct feature values. Referring to FIG. 8, an illustration 800 depicts this operation of associative distributors in accordance with the present embodiments. In the illustration 800, ten thousand training documents 802 are used for each of three distributors 810, 812, 814. A first distributor 810 is an extension distributor with a weight w1 equal to 0.5. A second distributor 812 is a language distributor with a weight w2 equal to 0.2. And a third distributor 814 is a clustering distributor with a weight w3 equal to 0.3. Given the weights (w) of the distributors 810, 812, 814 and the inputted ten thousand (n) documents 802, the extension distributor 810 returns five thousand documents 820, the language distributor 812 returns two thousand documents 822, and the clustering distributor 814 returns three thousand documents 824. All of the documents 820, 822, 824 are now ready for clustering 830.

In order to optimize the methods and systems in accordance with the present embodiments, one must experiment with different weights, combine the distributors, implement new distributors, and analyse the impact on the performance measures.

Figure 9:
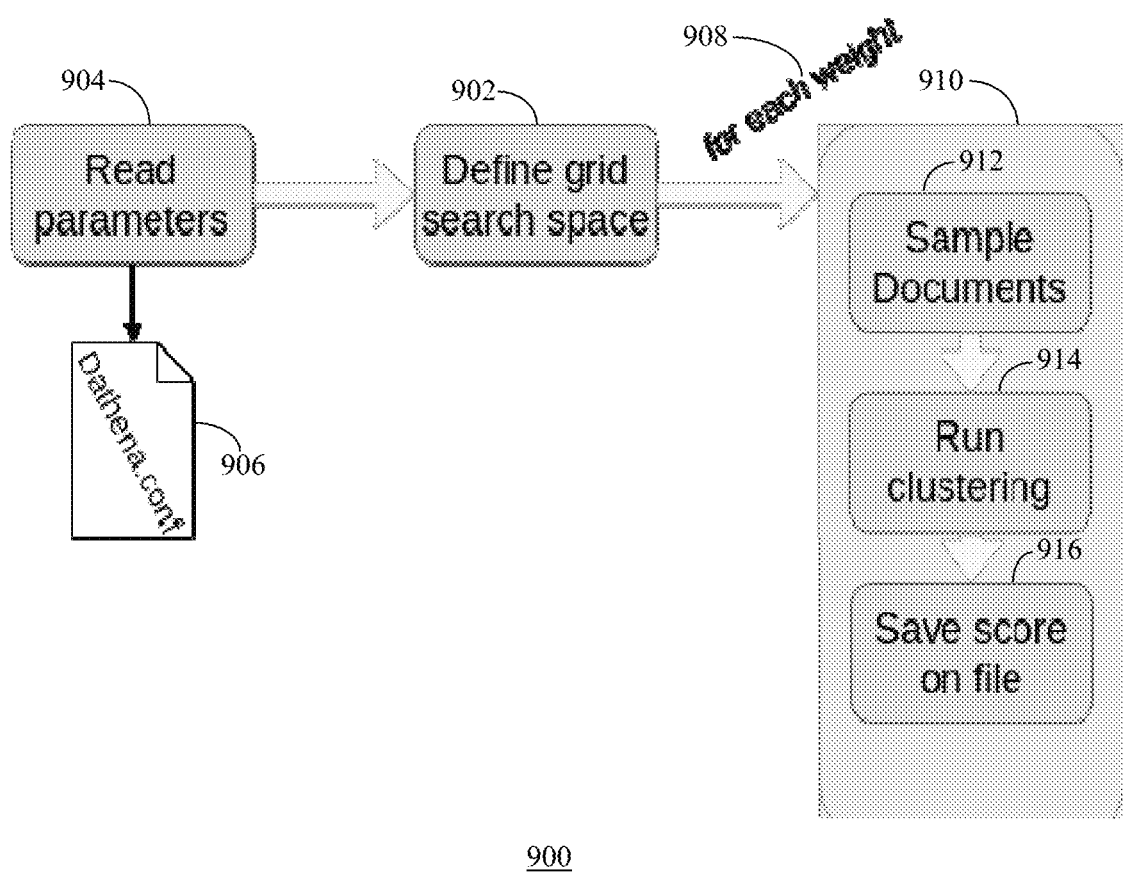
FIG. 9 depicts a block diagram of approximating distributor weights using grid search and silhouette scores of clusters in accordance with the present embodiments.

In accordance with the present embodiments, the best weights for our distributors are approximated by using grid search and the silhouette score of the clusters as a performance metric. Referring to FIG. 9, a block diagram 900 depicts an exemplary implementation of such approximation. Before defining a grid search space 902, the documents are separated into groups whose parameters should be treated with the same weights. The grouping process 904 is left to the user, however it should consist of finding predicates that characterize the groups to be created using the documents parameters or features. If such groups cannot be defined, all the documents are simply grouped together.

Thus, parameters of the documents are read 904, such as identifying confidential documents 906. The grid search space is defined 902 and, for each weight 908, the filtered set of documents are processed 910. For each filtered set of documents 910, the documents are sampled 912 using the sampling weights 908 in the grid search space 902, and the sampled documents are clustered 914 using the clustering weights. Once the clustering 914 is computed, the silhouette score is saved 916 and the clustering and sampling weights are stored in the table in case the best score has been obtained. Finally, the weights are updated according to the grid search policy and the process is rerun.

Clustering is a powerful unsupervised machine learning approach for text document grouping by using different features such as content vectors, metadata, and personal data information for the clustering. It is natural to assume that different features have different impact or weight for data clustering. For example, if it is desired to group the documents by a level of confidentiality, it is better to put a higher weight for PII features rather than for extension features. Weighted clustering aims to solve the problem of feature importance as in the case where every element is associated with a real-valued weight representing its "mass" or "importance". Based on these properties, the usage of clustering algorithms can be arranged into three modes: those that are affected by weights on all data sets, those that ignore weights, and those methods that respond to weights on some configurations of the data but not on others.

Figure 10:
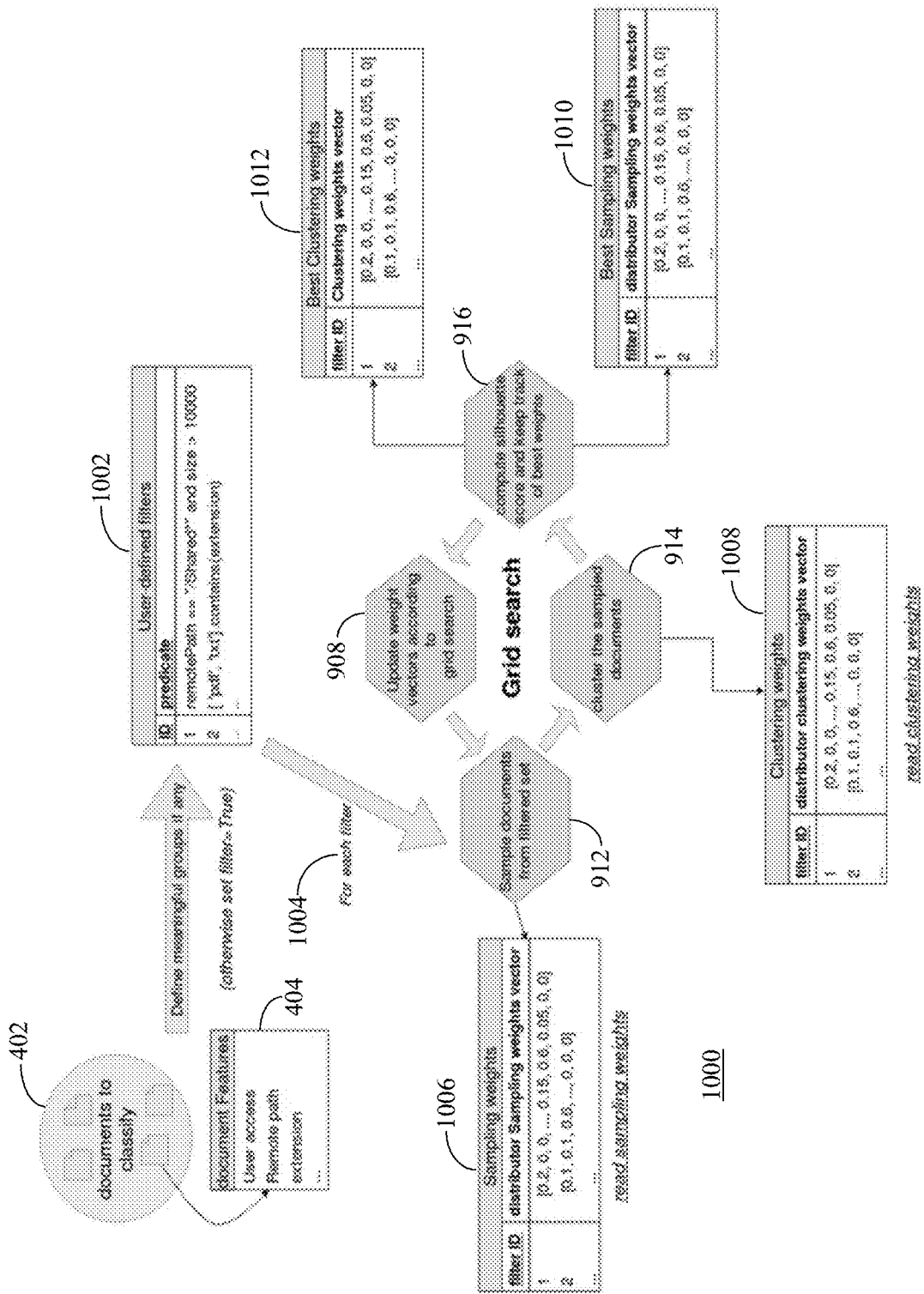
FIG. 10 depicts a flow diagram of pre-clustering in accordance with the present embodiments.

Referring to FIG. 10, a flow diagram 1000 depicts pre-clustering in accordance with the present embodiments. Within the documents to be classified 402, document features 404 such as user access, remote path or extension are identified to determine if any meaningful groups can be defined. If no meaningful groups can be defined, the filters are set 1002 to TRUE. Otherwise, the user-defined filters 1002 sets a user-defined predicate and, for each filter 1004, the filtered documents are provided to a defined grid search space 902 where documents in the filtered set of documents are sampled 912 and the sampling weights 1006 are read.

The sampled documents are then clustered 914 and the clustering weights 1008 are read. The silhouette score is computed 916 and the best weights (best sampling weights 1010 and the best clustering weights 1012) are kept track of by, for example, each time the clustering weights 1008 and the sampling weights 1006 are better than those stored, they are stored overwriting the previously stored weights. In this manner, the stored weights will always be the best sampling weights 1010 and the best clustering weights 1012. The grid search then updates the weight vectors 908 and sampling 912 and clustering 914 is performed again so that the sampling 912 and clustering 914 is performed for each weight 908. Once completed for all weights, the silhouette scores and the best sampling weights 1010 and the best clustering weights 1012 will be stored.

After pre-clustering, the weighted clustering 106 (FIG. 1) will be performed. The weighted k-means model 108 (FIG. 1) is used for training and produces the cluster IDs for each documents. K-means groups a data set Y into K clusters $S=\{S_1, S_2, \ldots, S_K\}$, and each cluster $S_k \in S$ has a centroid $c_k$ and each feature $v \in V$. The objective function for k-means is expressed in Equation (1):

$$W(S, C) = \sum_{k=1}^{K} \sum_{i \in S_k} \sum_{v \in V} (y_{iv} - c_{kv})^2 \quad (1)$$

where V represents a set of features used to describe each $y_i \in Y$ and the centroid $c_k$ is set to have a smallest sum of distances to all $y_i \in S_k$ and $$c_{kv} = \frac{1}{|S_k|} \sum_{i \in S_k} y_{iv} \quad (2)$$

To compute a k-means, first select the values of K entities from Y as initial centroids $c_1, c_2, \ldots, c_K$ and set S←∅. Then, assign each entity $y_i \in Y$ to the cluster $S_k$ represented by its closest centroid. If there are no changes in S, stop and output S and C. Otherwise, update each centroid $c_k \in C$ to the centre of its cluster $S_k$ and return to assign each entity $y_i \in Y$ to the cluster $S_k$.

K-means, though, has several weaknesses. First, the fact that the number of clusters K has to be known beforehand is a weakness. In addition, k-means will partition a data set Y into K partitions even if there is no clustering structure in the data. This is a greedy algorithm that may get trapped in a local minima. Further, the initial centroids, found at random heavily influence the final outcome. Finally, k-means treats all features equally, regardless of their actual degree of relevance.

So, in accordance with the present embodiments, a weighted k-means 108 is used. Feature selection methods effectively assume that each of the selected features has the same degree of relevance. Feature weighting algorithms, however, do not make such assumptions as there is no reason to believe that each of the selected features would have the same degree of relevance in all cases. For example, for k=1, 2, . . . , K, there are two levels of feature weighting: first, a feature weight $w_v$ for all clusters, subject to $\Sigma_{v \in V} w_v = 1$, and second, a cluster dependant weight $w_{kv}$, subject to $\Sigma_{v \in V} w_{kv} = 1$. Many feature weighting algorithms based on K-Means have been developed and are well-known to those skilled in the art. These include SYNCLUS, Convex K-Means (CK-Means), Attribute Weighting Clustering Algorithm (AWK), Weighted K-Means (WK-Means), Entropy Weighting K-Means (EW-KM), Improved K-Prototypes (IK-P), Intelligent Minkowski Weighted K-Means (iMWK-Means), Featured Weight Self-Adjustment K-Means (FWSA), and FG-K-Means (FGK).

Thus, it can be seen that the present embodiments provide methods and systems for documents classification, personal data extraction, purpose of the document processing prediction which can select a subset from a big data pool and can follow the same distribution as the big data pool while covering all significant specific use cases present in the full dataset. The present embodiments provide systems and methods for data management of documents in one or more data repositories in a computer network or cloud infrastructure which include sampling the documents in the one or more data repositories, formulating representative subsets of the sampled documents, generating sampled data sets of the sampled documents, and balancing the sampled data sets for further processing of the sampled documents. The formulation of the representative subsets is advantageously performed for identification of some of the representative subsets for initial processing.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A method for data management of documents in one or more data repositories in a computer network or cloud infrastructure, the method comprising:
sampling the documents in the one or more data repositories, wherein sampling the documents comprises sampling a document extension and one or more other metadata features of each of the documents;
formulating representative subsets of the sampled documents in response to the document extension and the one or more other metadata features of the sampled documents;
generating sampled data sets of the sampled documents in response to the metadata features of the sampled documents; and
balancing the sampled data sets for further processing of the sampled documents,
wherein the formulation of the representative subsets is performed for identification of at least one of the representative subsets for initial processing.

2. The method in accordance with claim 1 wherein the metadata features of the documents further comprise folder, department or location in the one or more data repositories, document date of creation, document date of modification, document size, document depth, document language, and/or number of personal identifying information (PII) in a document.

3. The method in accordance with claim 1 wherein sampling the documents in the one or more data repositories comprises filtering the documents in accordance with the document extension and one or more user-selected metadata features of the documents.

4. The method in accordance with claim 1 wherein sampling the documents in the one or more data repositories further comprises filtering the documents in accordance with distributors and weights.

5. The method in accordance with claim 1 wherein the generating the sampled datasets of the sampled documents comprises smart sampling the sampled datasets in either or both of a random sampling mode and a proportional sampling mode.

6. The method in accordance with claim 5 wherein the generating the sampled datasets of the sampled documents comprises smart sampling the sampled datasets by one of weighted clustering, combined distributors or hierarchical sampling prior to smart sampling the sampled datasets in either or both of the random sampling mode and the proportional sampling mode.

7. The method in accordance with claim 1 wherein the formulating representative subsets of the sampled documents comprises weighted clustering of the sampled documents.

8. The method in accordance with claim 7 wherein the weighted clustering of the sampled documents comprises weighted k-means clustering of the sampled documents.

9. The method in accordance with claim 7 wherein the weighted clustering of the sampled documents comprises weighted clustering of the sampled documents in a grid search space.

10. The method in accordance with claim 9 further comprising defining the grid search space in response to a computed silhouette score.

11. A method for data management of documents in one or more data repositories in a computer network or cloud infrastructure, the method comprising:
sampling the documents in the one or more data repositories;
defining a grid search space in response to a computed silhouette score and a best clustering weight and a best sampling weight;
formulating representative subsets of the sampled documents by weighted clustering of the sampled documents in the grid search space;
generating sampled data sets of the sampled documents; and
balancing the sampled data sets for further processing of the sampled documents,
wherein the formulation of the representative subsets is performed for identification of at least one of the representative subsets for initial processing.

12. A system for data management of documents in one or more data repositories in a computer network or cloud infrastructure, the system comprising:
a processing means coupled to the one or more data repositories in the computer network or cloud infrastructure and capable of processing metadata of the documents in the computer network or cloud infrastructure; and
a memory means coupled to the processing means and having instructions stored therein to enable the processing means to formulate therein one or more filters, a clustering module, a sampling module and a classification module,
wherein the one or more filters are configured to generate a sample of the documents in the one or more data repositories in response to a document extension and one or more other metadata features of the documents in the one or more data repositories, and
wherein the clustering module is configured to formulate representative subsets of the sampled documents in response to the document extension and the one or more other metadata features of the sampled documents, and
wherein the sampling module is configured to generate sampled datasets of the sampled documents in response to the metadata features of the sampled documents, and
wherein the classification module is configured to classify documents in the sampled datasets of the sampled documents.

13. The system in accordance with claim 12 wherein the one or more filters comprise predicates and distributors.

14. The system in accordance with claim 13 wherein the one or more filters define a grid search space.

15. The system in accordance with claim 13 wherein the predicates comprise user-defined predicates.

16. The system in accordance with claim 12 wherein the clustering module comprises a weighted clustering module.

17. The system in accordance with claim 16 wherein the instructions stored in the memory means further enable the processing means to formulate therein a k-means weighted module, and wherein the weighted clustering module is coupled to the k-means weighted module in order for the weighted clustering module to perform k-means weighted clustering of the sampled documents.

18. The system in accordance with claim 12 wherein the sampling module comprises a smart sampling module for generating the sampled datasets of the sampled documents in accordance with one or both of a random sampling mode and a proportional sampling mode.

19. The system in accordance with claim 18 wherein the sampling module comprises one or more of a weighted clustering module, combined distributors, or a hierarchical sampling module.

20. The system in accordance with claim 18 wherein the sampling module automatically reruns smart sampling of the sampled documents if sampling cluster quality is lower than a quality threshold.

21. The system in accordance with claim 12 wherein the classification module determines confidentiality of the documents in the sampled datasets of the sampled documents.

\* \* \* \* \*